(12) United States Patent
Vu et al.

(10) Patent No.: US 9,091,772 B2
(45) Date of Patent: Jul. 28, 2015

(54) SCINTILLATION DETECTOR GAIN CONTROL

(75) Inventors: Hieu Dinh Vu, Sugar Land, TX (US); Alexander Joseph Esin, Sugar Land, TX (US); Jia Ming Lu, Houston, TX (US)

(73) Assignee: Thermo Fisher Scientific Inc., Sugar Land, TX (US)

( * ) Notice: Subject to any disclaimer, the term of this patent is extended or adjusted under 35 U.S.C. 154(b) by 466 days.

(21) Appl. No.: 13/616,508

(22) Filed: Sep. 14, 2012

(65) Prior Publication Data
US 2014/0077073 A1 Mar. 20, 2014

(51) Int. Cl.
| | |
|---|---|
| G01T 1/40 | (2006.01) |
| G01T 1/164 | (2006.01) |
| G01J 5/52 | (2006.01) |
| H04N 5/33 | (2006.01) |

(52) U.S. Cl.
CPC .............. *G01T 1/40* (2013.01); *G01T 1/1642* (2013.01); *G01J 5/522* (2013.01); *H04N 5/33* (2013.01)

(58) Field of Classification Search
CPC ..... G01T 1/1642; G01T 1/2985; G01J 5/522; H04N 5/33
See application file for complete search history.

(56) References Cited

U.S. PATENT DOCUMENTS

| 3,922,541 | A | | 11/1975 | Seeman | |
|---|---|---|---|---|---|
| 4,300,043 | A | * | 11/1981 | Robbins | ........................ 250/262 |
| 5,023,449 | A | * | 6/1991 | Holenka et al. | ............ 250/252.1 |
| 5,160,844 | A | | 11/1992 | Albats | |
| 5,600,135 | A | * | 2/1997 | Jacobson | ...................... 250/261 |
| 7,800,052 | B2 | | 9/2010 | Gadot | |
| 8,022,355 | B2 | | 9/2011 | Kulik et al. | |
| 2011/0031405 | A1 | * | 2/2011 | Kulik et al. | ................... 250/362 |

FOREIGN PATENT DOCUMENTS

| AU | 584311 | 5/1989 |
|---|---|---|
| EP | 0483007 | 4/1992 |
| GB | 2409035 | 6/2005 |

OTHER PUBLICATIONS

Hamamatsu Photonics K.K., Electron Tube Division, Photon Counting Using Photomultiplier Tubes, Technical Information, TPHO9001E04, 28 pages, 2005.
Lenkszus et al., "Discriminator-Stabilizer with Internal Compensation for External Gain Shifts," IEEE Transactions on Nuclear Science, 17, 285-290, 1970.

* cited by examiner

*Primary Examiner* — Casey Bryant
(74) *Attorney, Agent, or Firm* — Gordon Stewart; William McCarthy

(57) ABSTRACT

A method, apparatus, and computer program products for controlling gain in a scintillation detector. Calibration count rates, each representing an integral count rate above a different threshold, are obtained from a photomultiplier tube. Photomultiplier tube gain is adjusted if a result from evaluating a relationship of calibration count rates varies from an expected result based on integral count rate versus threshold for a reference peak in the energy spectrum of the radiation source. An additional, different relationship may also be evaluated and an additional gain adjustment performed when a result indicates that the calibration count rates are not from the reference peak. A same radiation source may be used for collecting test counts and calibration counts.

34 Claims, 9 Drawing Sheets

Demonstration of Co60 integral spectrum (X – axis values were from high to low)

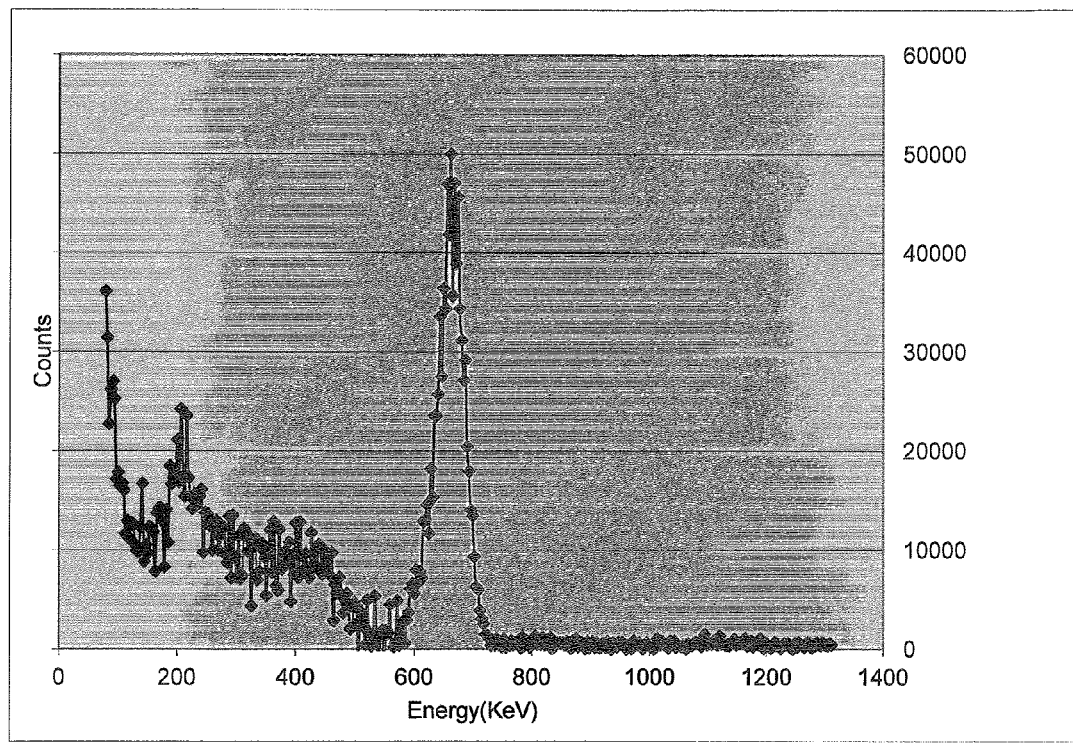
Figure 1: CS137 Energy Spectrum

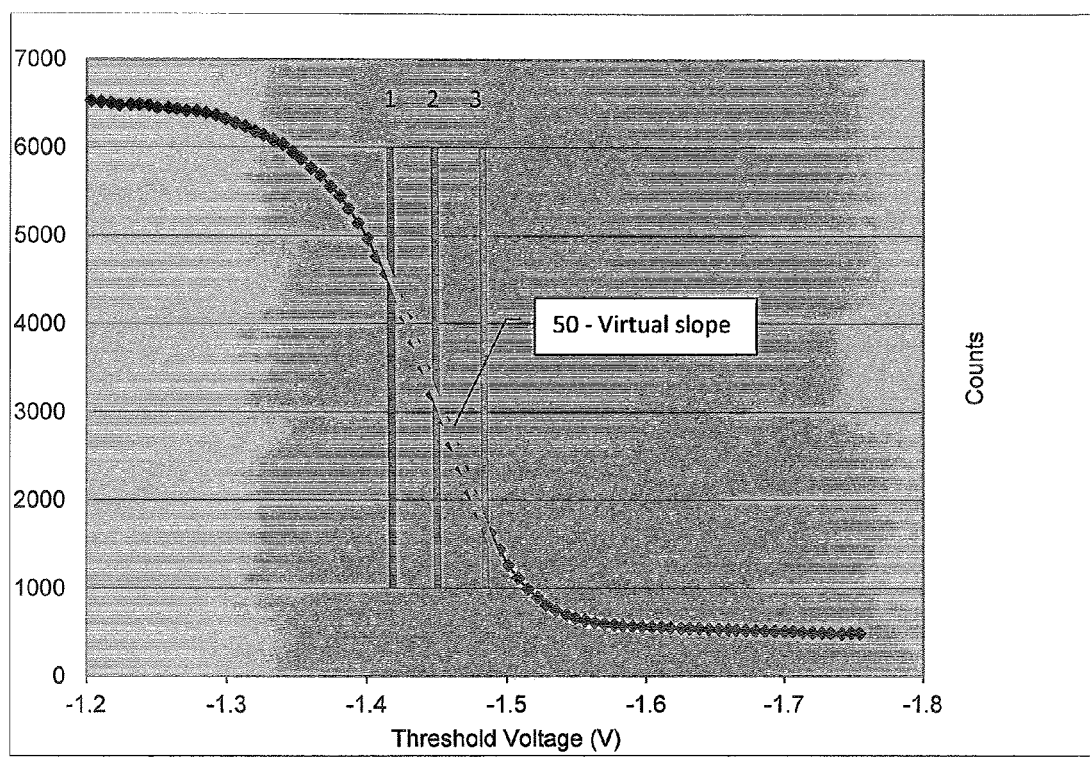
Figure 2: NaI integral spectrum for Cs137

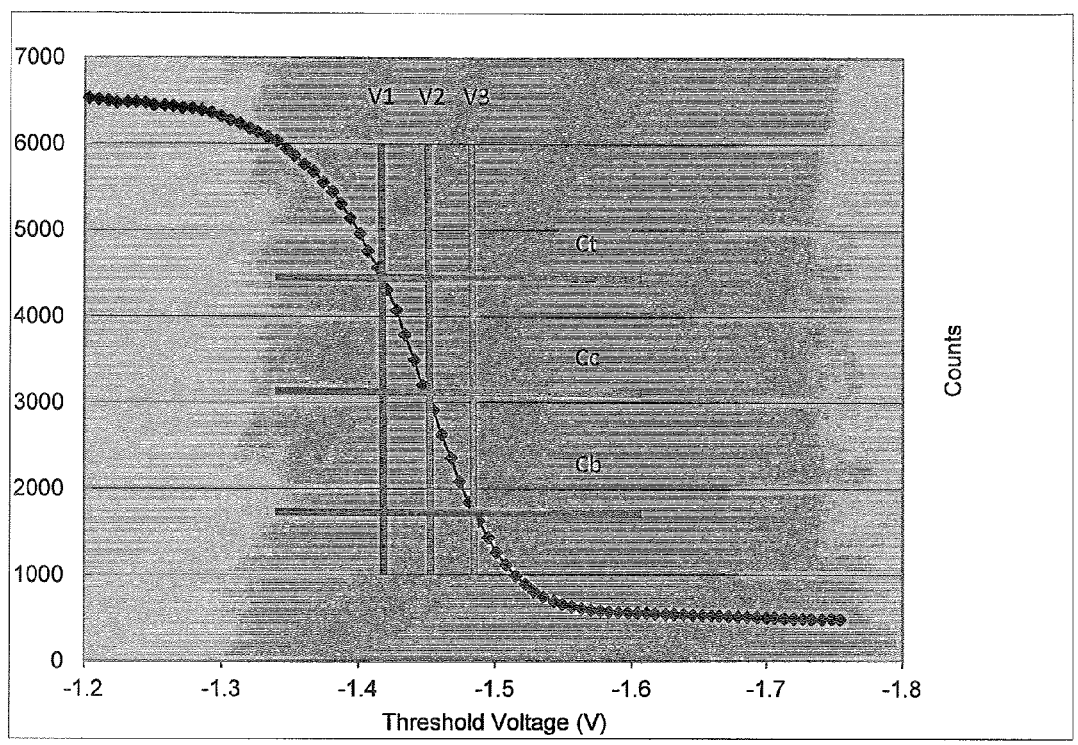
Figure 3: NaI Integral spectrum stabilization

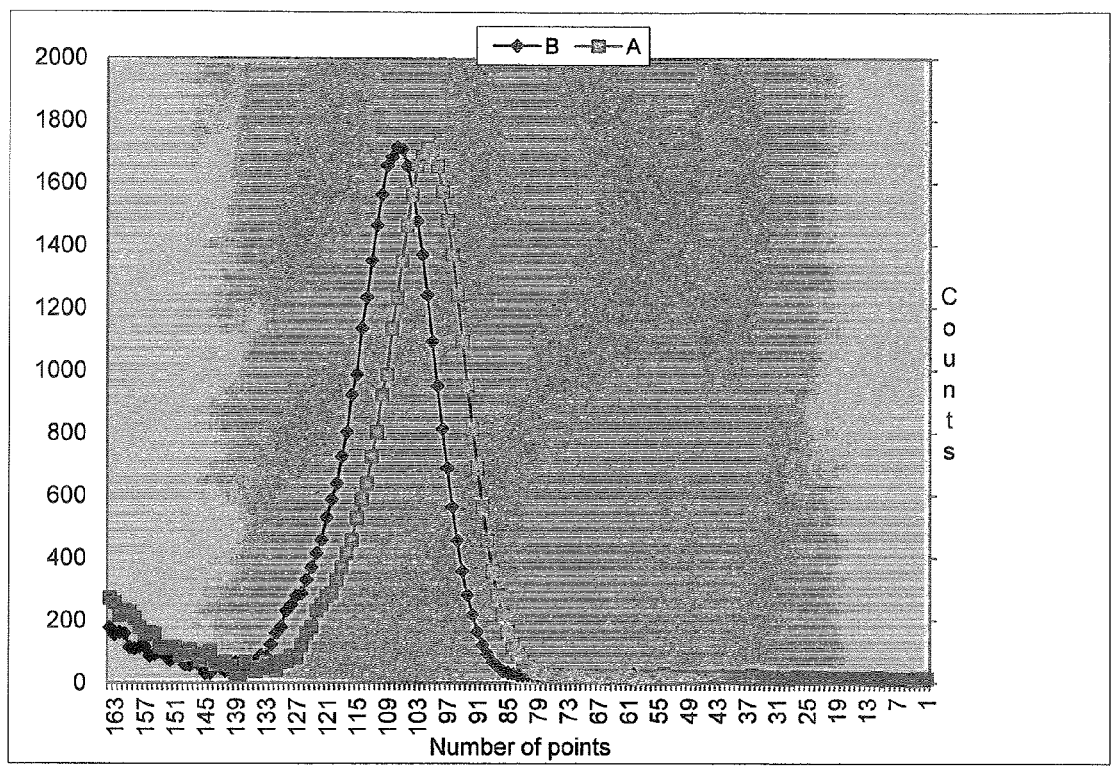
Figure 4: A and B response of Cs137 (X – axis values were from high to low)

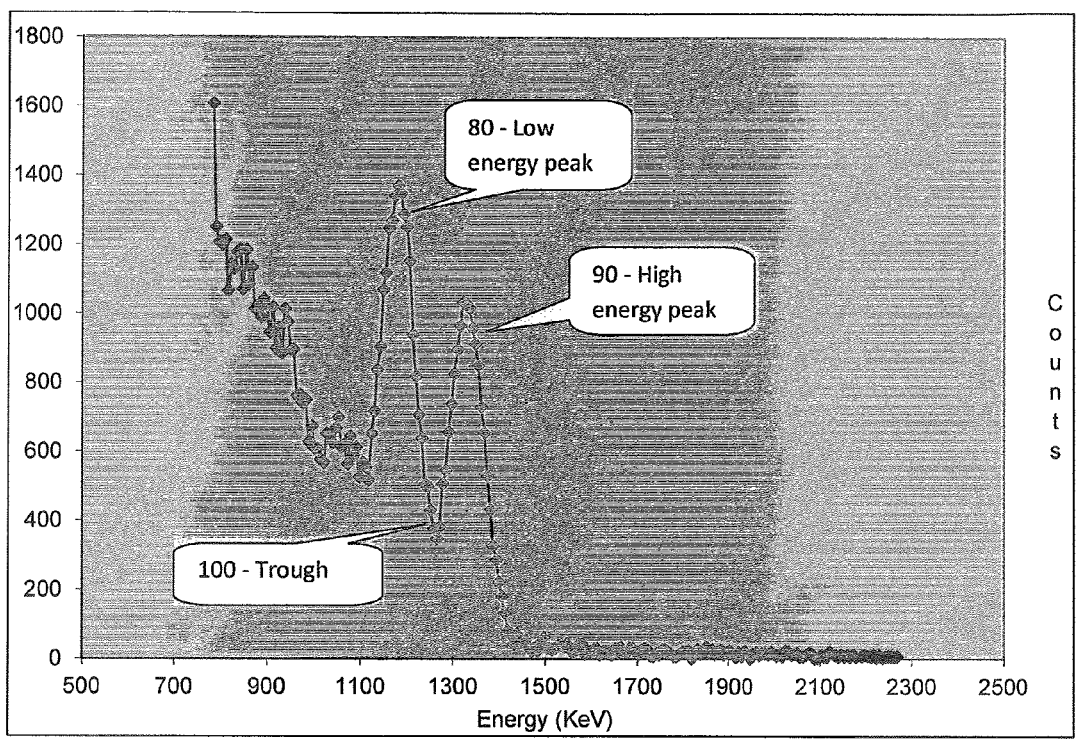
Figure 5: Co60 energy spectrum

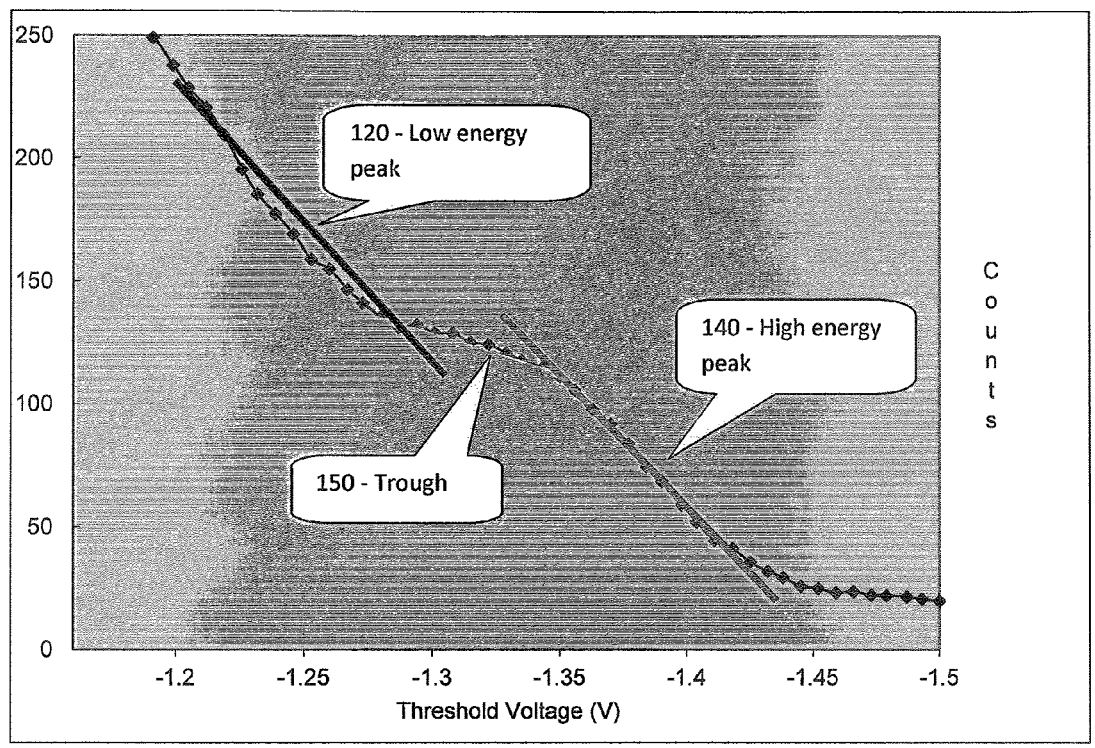
Figure 6: Demonstration of Co60 integral spectrum (X – axis values were from high to low)

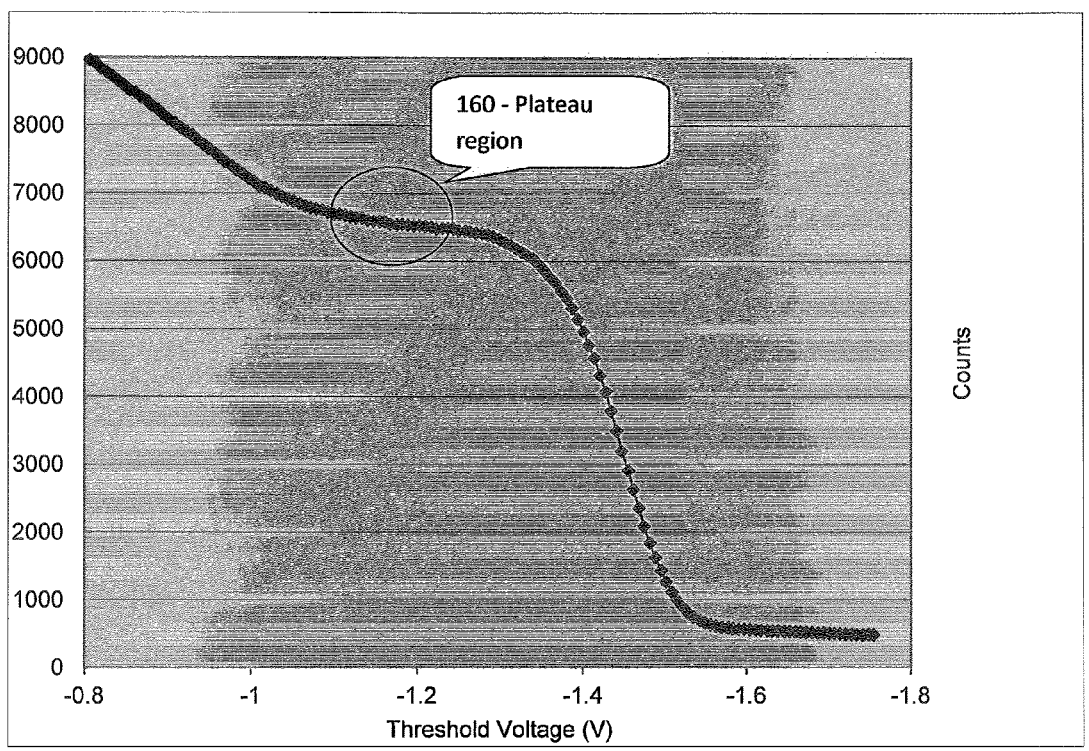
Figure 7: Integral spectrum for Cs137

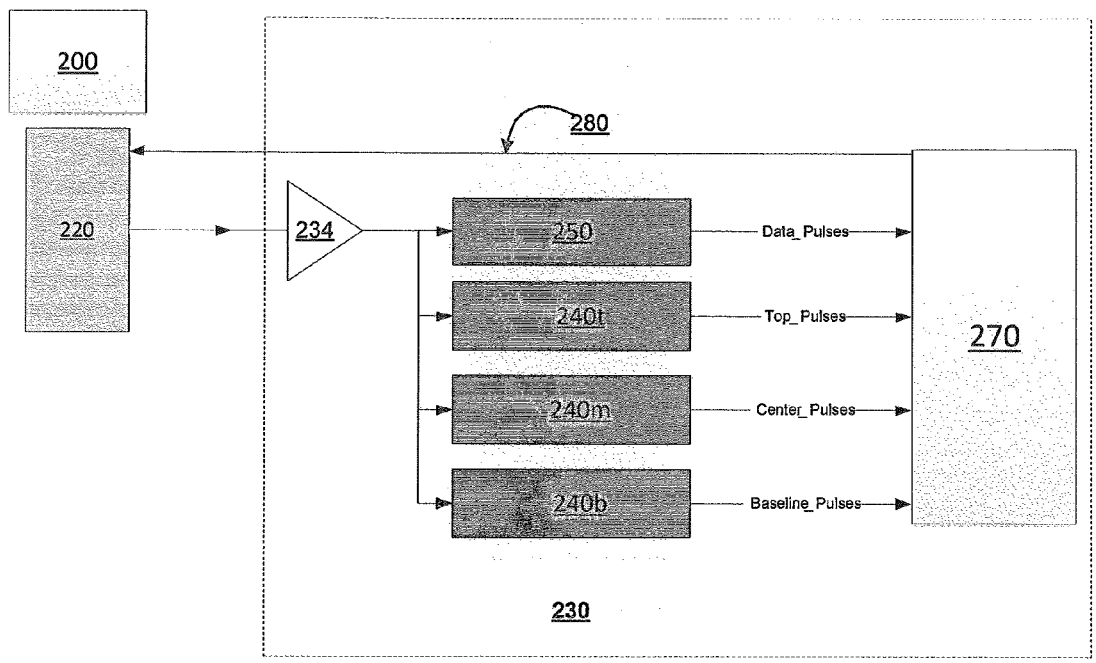
Figure 8: Block diagram

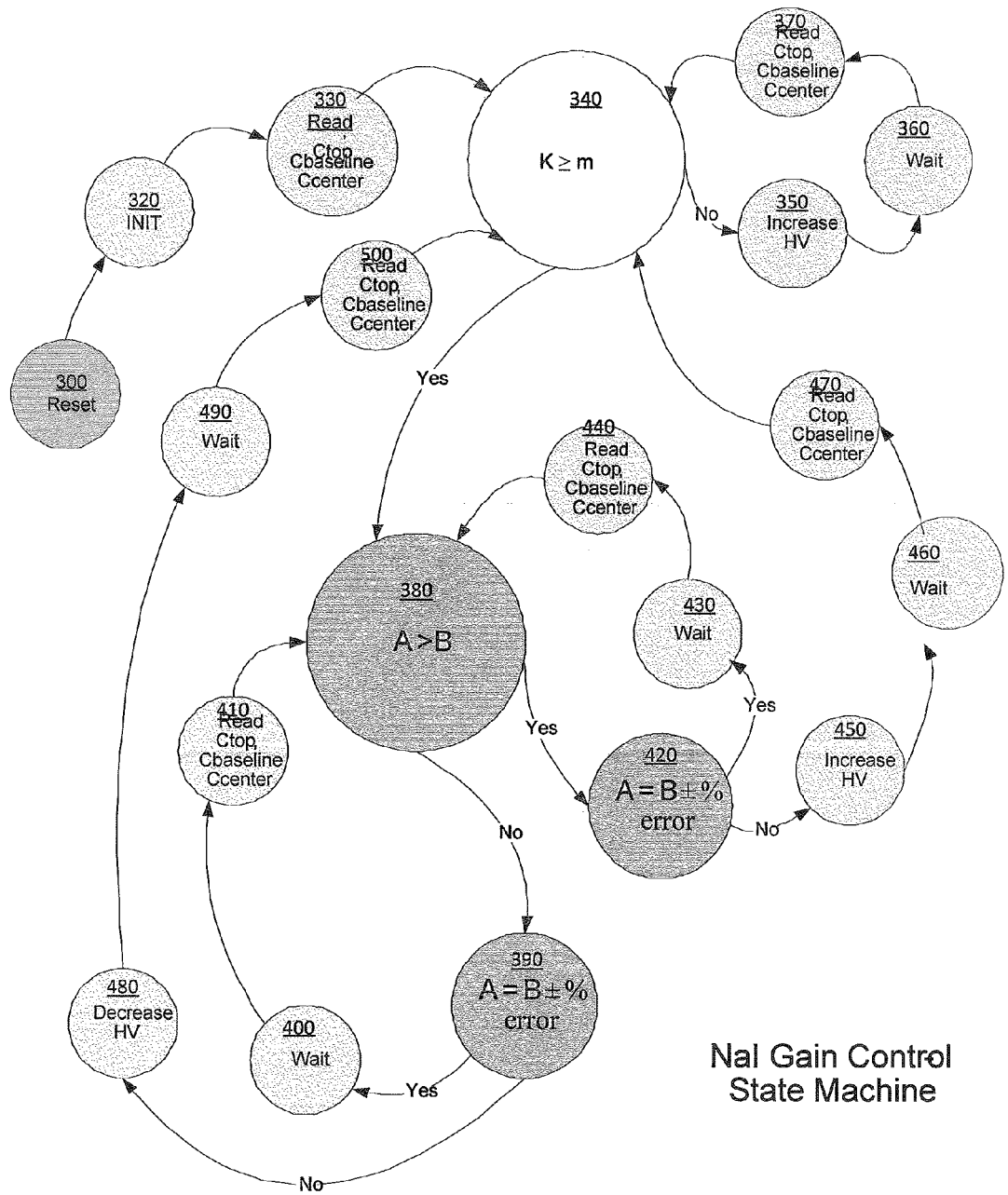
Figure 9: HV control algorithm

SCINTILLATION DETECTOR GAIN CONTROL

FIELD

This invention generally relates to scintillation detection.

BACKGROUND

Scintillation detectors are well known and are used to detect ionizing radiation, such as gamma or x-rays produced from a source. Applications include detecting the density and level of materials in containers, as well as identifying elements based on emitted spectra or forming images of items through which the ionizing radiation passes (for example, medical or industrial imaging). Such scintillation detectors include a scintillator, which emits light in response to receiving a quanta of the ionizing radiation, and a light detector which generates an electrical signal in response to light from the scintillator. The scintillators may be a transparent crystal, such as a NaI or CsI crystal, typically doped (for example with thallium), though many other materials are known (for example, bismuth germanante, gadolinium silicate, and others). While various light detectors are also known the PMT (PMT) is commonly used in view of its relatively low cost, ease of operation, and sensitivity. The electrical pulses produced by PMTs may be counted by, for example an electronic counter. The density of at a location of an item can be estimated by counting pulses resulting from ionizing radiation which has passed through or been scattered from the item. Also, in other applications these output pulses can be analyzed and a pulse distribution at different energies may be obtained (an "energy spectrum"). Typically this will be a spectrum of pulse counts at each energy (or amplitude). Distinct peaks at each energy level can be evaluated and elements identified based on the energy spectrum. Applications of the foregoing types are well known.

The PMT is a highly sensitive detecting device for converting light into amplified electrical signals. A typical PMT includes an evacuated glass tube and a series of electrodes disposed within the tube. The series of electrodes includes a photocathode from which a light source enters the tube, a focusing electrode, a plurality of dynodes that function as an electron multiplier, and an anode where the multiplied charge accumulates. In operation, a high voltage source is used to hold each successive dynode at a higher voltage than the previous dynode, with the anode being at the highest potential. When incident photons (incident light) strike the photocathode of the PMT, the photons eject photoelectrons due to the photoelectric effect. The photoelectrons emitted from the photocathode are accelerated by an electric field, and are directed toward the electron multiplier (the series of dynodes) by the focusing electrode. The electron multiplier multiplies the photoelectrons by a process of secondary emission. When the multiplied photoelectrons reach the anode, they are output as an electrical signal.

More specifically, when the accelerated photoelectrons strike the first dynode, secondary electrons are emitted through secondary emission. These secondary electrons join the first batch of photoelectrons and are accelerated toward the next dynode. This process is repeated over successive dynodes. This cascade effect of secondary emission results in an increasing number of electrons produced at each successive dynode. In other words, charge is amplified at each successive dynode. When the electrons reach the anode, they are output as an amplified electrical signal. As a result of the above process, even a small photoelectric current from the photocathode can provide a large output current at the anode of the PMT. The amplification, which may be referenced as "gain" depends on the number of dynodes, accelerating voltage, temperature, and the like.

PMTs provide advantages such as high internal gain, high sensitivity, fast responses, low noise, and a high frequency response. However, the gain of scintillators and light detectors such as the PMT may fluctuate due to various factors such as temperature and age. This can lead to variable PMT output over time even from the same received ionizing radiation, which in turn can lead to misinterpretation of results.

SUMMARY

The present invention provides methods, apparatus and computer programs for controlling the gain of scintillation detectors. The scintillation detector may include a scintillator and a detector which receives light from the scintillator. While a PMT is typically used as the detector, it is to be understood any of the embodiments of the present invention may use any other type of detector with adjustable gain in place of a PMT. Therefore, whenever "PMT" is used in any described embodiment, other embodiments could be of the same construction but with "PMT" replaced more generally with "detector with adjustable gain".

In some embodiments the present invention provides a method for controlling gain in a scintillation detector comprising a scintillator and a PMT which receives light from the scintillator. The method may include exposing the scintillator to a radiation source and obtaining calibration count rates from the PMT, each representing an integral count rate above a different threshold. A first comparison of at least some of the calibration count rates is performed, as well as a second comparison of the calibration count rates which differs from the first comparison. When a result of the first comparison indicates that the calibration count rates (that is, all the calibration count rates used for the first comparison) do not correspond to a reference peak in the energy spectrum of the radiation source, the method may include performing a first adjustment of the PMT gain until the result indicates the calibration count rates do correspond to the reference peak. When a result of the second comparison varies from a relationship of integral count rate versus energy threshold resulting from the reference peak, the method may include performing a second adjustment of PMT gain so as to reduce the variation. By "different" comparisons in this context is referenced that different mathematical functions are used, not just values in a same function.

Other embodiments of methods of the present invention provide a method for controlling gain in a scintillation detector having a scintillator and a PMT as previously described. In these embodiments the method may include exposing the scintillator to a radiation source and obtaining calibration count rates from the PMT, each representing an integral count rate above a different threshold. A comparison of at least some of the multiple calibration count rates is performed and, when a result of the comparison varies from a relationship of integral count rate versus energy threshold for a reference peak, an adjustment of PMT gain is performed so as to reduce the variation. These embodiments may also include obtaining from the PMT, when exposed to the same radiation source, a test count rate representing an integral count rate with an energy threshold which lies on a plateau of integral count rate versus threshold.

Scintillation detectors are further provided in some embodiments, which include a scintillator and PMT as already described, as well as a processor. The processor, following exposure of the scintillator to a radiation source, may perform any of the methods of the present invention. Computer program products are further provided in embodiments of the invention, which carry a computer program which, when loaded into a programmable processor, can execute any of the methods of the present invention.

BRIEF DESCRIPTION OF THE DRAWINGS

Embodiments of the invention will now be described with reference to the drawings in which:

FIG. 1 shows the energy spectrum of Cs137 with a single peak in the gamma ray spectrum, acquired with a NaI scintillator and PMT.

FIG. 2 illustrates the straight line relationship of integral count rate versus threshold for Cs137 resulting from the single peak in the energy spectrum of FIG. 1.

FIG. 3 is the same plot of FIG. 2 but labeled to illustrate a particular comparison as the basis for an adjustment of PMT gain in an embodiment of the present invention.

FIG. 4 illustrates how application of the comparison provides a unique solution with Cs137 which is used to for the adjustment of PMT gain.

FIG. 5 shows the energy spectrum of Co60 acquired with a NaI scintillator and PMT, and showing the two relatively close peaks in the gamma ray spectrum.

FIG. 6 is a spectrum of integral counts versus threshold for Co60 and illustrates how an additional first comparison and a first adjustment of PMT gain is used prior to the second adjustment, to avoid the second comparison and adjustment locking onto the wrong peak in the energy spectrum.

FIG. 7 is a graph similar to FIG. 2 and illustrates acquisition of test counts in a method of the present invention.

FIG. 8 is a block diagram of a scintillation detector in accordance with an embodiment of the present invention.

FIG. 9 is a state diagram illustrating a method of the present invention.

DETAILED DESCRIPTION OF SOME EMBODIMENTS OF THE INVENTION

Embodiments of the present invention recognize that as temperature or other environmental conditions change, the gain of a scintillation detector will tend to vary. This results in a test count rate from a same test item appearing to the scintillation detector to vary over time even though nothing is actually changing. As a consequence, inaccurate test count rates from different test items may be obtained. It is possible to compensate for this by adjusting gain, such as by adjusting the PMT voltage. A reference peak in an energy spectrum of a radiation source can serve as a suitable reference for adjusting the gain such that consistent readings are obtained from the reference peak. Embodiments of the present invention further recognize that many radiation sources have a peak in their energy spectrum which can be used as a reference peak and which results in a relationship of integral count rate versus threshold which is linear and of fixed slope in a given scintillation detector. As a result, adjusting the gain to ensure that the calibration count rates remain on the linear region can provide the basis of a relatively simple implementation of gain control. Such integral count rates are referenced as "calibration count rates" since they would normally be taken without any test item between the source and the scintillator, whereas "test count rates" are performed with the test item present. As will be further discussed, relatively simple implementations of ensuring that calibration count rates fall on the linear region can be obtained by comparing the count rates (that is, comparing them with one another) according to various formulae.

However, some embodiments of the present invention further recognize that difficulty may arise where the radiation source has multiple peaks in the energy spectrum which are close together, such as within 20% or 30% (as measured using the lowest energy peak as the denominator) or within 200 keV to 300 keV of one another. For example, Co60 exhibits a high energy peak at 1.33 MeV that might be used as a reference peak, but also has a low energy peak at 1.17 MeV which is close to the high energy reference peak. Under ideal operating conditions a comparison of calibration count rates from Co60 may yield a result which fits the relationship of integral count rate versus energy threshold corresponding to the high energy reference peak. For example, the result may show that the calibration count rates fall on the linear portion of a plot of count rates versus threshold. As PMT gain varies due to environmental changes, or during instrument startup, this plot will tend to move left or right. When the radiation source has only the reference peak in the energy spectrum, or has other peaks which are well separated from the predetermined peak, the method may simply perform an adjustment of PMT gain until the result of the comparison shows that the calibration count rates are back on the linear portion of the plot. However, the low energy peak in Co60 which is close to the high energy reference peak may "interfere" with the reference peak and foregoing adjustment in the sense that the plot may move far enough so that the calibration count rates then fall on a portion of the plot which corresponds to that low energy peak rather than the high energy reference peak. In this situation, depending upon the comparison used for the foregoing adjustment, the method might incorrectly assume the count rates are from the linear portion of the plot of integral count rate versus threshold corresponding to the reference peak. For this reason, the method may include a first gain adjustment based on a first comparison which is different from the comparison used for the foregoing adjustment, and which may help ensure that the calibration count rates in fact correspond to the reference peak (and not, for example, to another peak in the energy spectrum). These aspects of operation of embodiments of the present invention are described further below.

In some embodiments the relationship of integral count rate versus energy threshold resulting from the reference peak may be linear. In this situation the first comparison may determine if a line on which at least some of the calibration count rates lie, meets a predetermined slope requirement (for example, being greater than some minimum slope). One way of determining this is by calculating a ratio of at least some of the calibration count rates. In one embodiment, the calibration count rates may comprise three count rates which are obtained at upper, intermediate, and lower thresholds (such as an upper threshold, a lower threshold which is taken near the baseline of integral count rate versus threshold, and a threshold which is central between those two values). The second comparison may comprise comparing the difference between the calibration count rates at the upper and intermediate thresholds, with the difference between the calibration count rates at the intermediate and lower thresholds. In this situation, the second adjustment of PMT gain is performed when the two differences are not representative of a straight line (for example, the two differences are not within a tolerance of being equal where upper, lower, and central threshold values are used). This type of second comparison is relatively easy to implement in hardware and/or software. However, this type of second comparison by itself may not ensure the calibration count rates correspond with the reference peak when sources having a nearby peak in the energy spectrum, such as Co60, are used.

Methods of the invention may further include obtaining from the PMT, a test count rate with an energy threshold which lies on a plateau of integral count rate versus threshold. The radiation source may be the same source from which the calibration count rates were obtained. The test count rates may be collected with the test item interposed between the source and the scintillation detector in any suitable manner, such that radiation from the source which passes through the test item is detected by transmission.

In any embodiment of the present invention, the calibration count rates may be obtained with a test item in place between the radiation source and the scintillator.

In any embodiment of the present invention the photomultiplier tube gain adjustment may be performed with the test item in place between the radiation source and the scintillator.

Further, in any embodiment of the present invention calibration count rates may be repeated collected and the gain adjustment repeatedly made, over the same time period during which test count rates are collected.

As pointed out above, apparatus of the present invention may include a scintillator and PMT as already described, and a processor to execute any method of the present invention. In particular embodiments the scintillator may comprises a NaI, CsI, or other crystal, any of which may have suitable dopants as is well known in the art of scintillator technology.

Multiple repetitions of any operation or sequence are also contemplated in any embodiment. For example, the calibration count rates can be continuously collected and the first comparison and first adjustment performed repeatedly until the calibration count rates correspond with the reference peak. Similarly, multiple second comparisons and second adjustments of PMT gain can be performed repeatedly. Additionally, as calibration count rates are continuously collected, the entire sequence of obtaining calibration count rates, performing the first comparison and first adjustment, and performing the second comparison and second adjustment, can be repeated multiple times and even continuously while the scintillation detector is operating.

In the present application, unless a contrary indication appears, the following terms are used as described. "Identifying" or "identifying the presence" or similar terms, includes either or both a qualitative evaluation (for example, the substance is or is not present) as well as a quantitative evaluate (that is, how much is present). By "suitable" is referenced that something (such as a surface) does not meet any predetermined criteria, such as not meeting predetermined performance criteria or criteria that indicates the surface is not authorized for use with a particular instrument. "May" in this application references something that is optional, for example if an item "may" be present then that means that item either is present or is not present. Similarly, when an element or feature of an apparatus or method or computer program, is said to "may" be present, this references that it may or may not be used as part of any embodiment of the present invention. "Or" in this application includes any single item of multiple items referenced, as well as any combination of the referenced items. For example, "using A or B" means any one of: using A; using B; using A together with B. The term "at least" in relation to some features, such as "at least three calibration count rates" is used only to emphasize a minimum number in that particular case and it is to be understood that "a", "the" and the like in relation to other features in an embodiment having or comprising various elements, still allows for multiple of the referenced features to be used unless otherwise clearly indicated to the contrary. For example "a radiation source" allows for the presence of multiple radiation sources.

A "processor" as used herein may be any hardware or hardware/software combination which is capable of carrying out the steps require of it. For example, a processor may be a suitably programmed microprocessor or application specific integrated circuit. A processor may also include a memory of any known type, such as a read-only or read-write memory, which holds instructions and data for spectrometer operation as described herein. The operations or sequences of any method described in the present application can be performed in the order described or in any other order that is logically possible. Typically though, a second adjustment of PMT gain, may follow any first adjustment. Words such as "first" and "second" are used as labels to distinguish similarly named events or components, and do not necessarily imply any order of events or that events or items so labeled must be used together. While a phrase such as "at least some" is used in some instances to specify one or more of a group, even in situations where that phrase is not used less than a group might still be used. For example, when "a PMT" is referenced there could be multiple PMTs present but with only one or some other number used in a method of the present invention. A computer program "product" is a tangible, non-transitory medium, which may carry a computer program of the present invention (for example, a magnetic, optical, or solid-state memory) in a non-transitory, but potentially temporary, form. "Linear" represents a straight line. However, by "linear", equal, or other terms representing any relationship, it will be understood that the relationship need not be an exact one, but instead some tolerance may be allowed and the benefits of the present invention still obtained. For example, "linear" may have some predetermined small variation from exactly straight. Occasionally a relationship may be expressly stated to include a tolerance, for emphasis. However, it will be understood that while zero tolerance may be used there will typically be some predetermined tolerance allowed in any stated relationship. "Integral count rate" references the total count rate of all pulses detected above a threshold energy level, where the energy level may be represented by the signal amplitude from the PMT. The highest energy level to which they are summed will typically be the highest energy level which can be detected by the particular instrument of which the scintillation detector is a part, or to a baseline where no further counts are detected from a given source. "Threshold" and "energy threshold" are used interchangeably herein. When integral count rates "correspond" with a peak in the energy spectrum, this references that the energy threshold of the count rates result from an energy level on the energy spectrum at which that peak is present.

Any reference cited in the present application is incorporated into this application in its entirety by reference, except to the extent to which it may conflict with the present application in which case the present application prevails.

Referring now to FIG. 1, there is shown the energy spectrum of Cs137 in the gamma ray region acquired using a scintillation detector with a doped NaI crystal and PMT. As can be seen, Cs137 exhibits a single high energy peak at 661.7 keV which can be used as the reference peak as well as another lower energy peak (not shown) at 32 keV. FIG. 2 shows a plot of count rate ("counts" in the Figures) versus threshold around the region of the 661.7 keV peak in FIG. 1 under typical operating conditions (that is, temperature and other environment) and with normal gain of the scintillation detector. The data for FIGS. 2 and 6 was accumulated using the following procedure:

8 μC of Cs137 or Co60 was placed 2" from the scintillation detector.

A function generator was used to set up a ramp from −1.8 V to −1.2 V with step side of 0.007 V per 100 seconds.

The output of the function generator was used to set the discriminator threshold voltages.

The PMT HV was set at 890 V.

The Labview program accumulated counts for 100 seconds and then recorded the accumulated counts and discriminator threshold voltages.

Results are shown in FIG. 2 and FIG. 6.

Note the relationship of count rates to threshold is a linear one in the region between 1, 2, and 3 in FIG. 2 (region 50). That is, the plot of integral count rate versus threshold exhibits a linear relationship in the region 50 which corresponds to the reference peak of 661.7 keV peak in the energy spectrum. As temperature changes scintillation detector gain will change and the plot of FIG. 2 will tend to move left or right. However, it has been found that the shape of the plot, including the slope of linear region 50, will tend to remain the same over temperature changes and time. Cs137 also exhibits another peak (not shown) of low energy at 32 keV. However, this other peak is not close to the high 661.7 keV peak. In fact, the two peaks are so far apart that any gain change in the scintillation detector resulting from temperature or other environmental changes, will not move the plot of FIG. 2 far enough so that the integral count rate versus threshold for that low energy peak could move into the region between thresholds 1, 2, and 3 of FIG. 2. Consequently, the low energy peak cannot interfere with the high energy peak and gain adjustment in the sense described above, and can be ignored.

A comparison used for a gain adjustment will now be illustrated with reference to FIG. 3. These will be sometimes referenced as a "second comparison" and "second adjustment" particularly when used with a "first comparison" and "first adjustment" as described below in connection with FIG. 6. However, in some embodiments this "second" comparison and adjustment may be used without any "first" comparison and adjustment. Referring now to FIG. 3, threshold voltages V1, V2, and V3 can be set at positions 1, 2, and 3, respectively, representing an upper threshold (V1), a lower thresholds (V3) near the baseline of the plot, and a central threshold (V2) midway between V2 and V3. Each will have a corresponding count rate Ct, Cc, or Cb (which will be referenced as calibration count rates) resulting from normal gain of the scintillation detector at typical operating conditions. One can select V1, V2, V3 such that:

$$V1-V2=V2-V3 \quad (I)$$

Since the region between V1 to V3 in the plot of FIG. 3 is linear then the followings condition will be met:

$$(Ct-Cc)/(V1-V2)=(Cc-Cb)/(V2-V3) \quad (II)$$

From (I) and (II):

$$(Ct-Cc)=(Cc-Cb) \quad (III)$$

By setting:

$$A=Ct-Cc \quad (IIIa)$$

$$B=Cc-Cb \quad (IIIb)$$

then A=B at normal gain, or stated another way the two differences should be equal at normal gain. This result can also be seen from FIG. 4 where A and B versus threshold are plotted. As can be seen from FIG. 4 there is only one unique solution for A=B at normal gain. If the result of the comparison of the three calibration counts provided by (III) should vary from equality, then the scintillation detector gain has varied from normal. In FIG. 3 this results in the plot moving left or right. In that event a second adjustment of PMT gain can be performed by adjusting PMT voltage until (III) is again true (the plot is brought back to that position shown in FIG. 3). More specifically:

If A=B then gain is normal and the current PMT voltage is maintained without change.

If A>B the gain has decreased and should be increased by increasing the PMT voltage.

If A<B the gain has increased and should be reduced by decreasing the PMT voltage.

In practice, some predetermined tolerance will be allowed around the requirement that A=B to avoid continuous attempts to compensate for minor gain fluctuations.

The foregoing method for obtaining a second adjustment of PMT gain is effective with a radiation source such as Cs137 which has only the reference peak in the energy spectrum, or at least where any other peaks are not close to the reference peak. However, as previously mentioned, when a radiation source is used which has another peak in the energy spectrum close to the reference peak, that other peak may "interfere" with the foregoing method. The use a first adjustment of PMT gain based on a comparison of the calibration count rates which is different from that of (III) may help avoid this problem with such a source by identifying when the calibration count rates do not correspond with the reference peak. This can be understood with reference to a Co60 radiation source, whose energy spectrum is shown in FIG. 5 and which exhibits a low energy peak at 1.33 MeV peak (80) and a 1.17 MeV high energy peak (90) which may be used as the reference peak. The corresponding plot of integral count rate versus threshold is shown in FIG. 6. In FIG. 6 the region 140 corresponds to the high energy peak and exhibits a linear relationship as shown by the solid line of fixed slope, while the region 120 corresponds to the low energy peak and exhibits a relationship that is not quite linear as shown by the solid line of same slope as the solid line for region 140. It has been found that the shape of the plot of FIG. 6, including the slope of region 140, will tend to remain the same over time and temperature changes though the plot position will tend to move left or right.

In FIG. 6 it is possible to set a V1, V2, and V3 on upper, central, and lower (particularly, baseline) voltages about region 140 and use a comparison such as in (III) as the basis for an adjustment of PMT gain in the same manner as described above in connection with FIGS. 2 and 3 for Cs137. However, as temperature changes the plot in FIG. 6 may shift to the right and region 120 may then occupy at least part of the region formerly occupied by region 140, or the plot may shift to the left. As a result, the comparison of (III) may begin operating in region 120 rather than region 140, or to the right of region 140, thereby resulting in an incorrect gain setting. Another way of viewing this is that, unlike the situation with Cs 137, the comparison of (III) has more than one solution for Co60. For example, that comparison is true along line 140 in FIG. 6 on which all the calibrations counts correspond to the reference peak. However, that comparison can also be true along a line such as line 150 in FIG. 6, which is no longer using calibration counts which all correspond with the reference (high energy) peak. Similarly, that comparison of (III) can also be true as the plot moves to the left.

To help avoid the foregoing situation, another comparison (a "first comparison") of the calibration count rates is used to ascertain if the calibration count rates correspond with the reference peak in the energy spectrum. In particular, this first comparison can compare calibration count rates to determine if they fall on a line with a slope which meets a predetermined slope requirement, such as falling on a line which has a slope substantially less than the slope of region 140. One easy way of accomplishing this for a given scintillation detector is to find a ratio "K", where for region 140 where:

$$K=Ct/Cb \quad (IV)$$

A value of K can then be predetermined for a given scintillation detector, which value is substantially less than the foregoing and which would indicate that the calibration count rates are not from region 140. In the particular apparatus described below K is set at an integer "m", where m=2. In operation then, whenever K<2 then a first adjustment of PMT is performed until K>2, following which a second adjustment is then performed based on the results of the comparison of (III) in a similar manner as for Cs137.

When the scintillation detector gain is controlled using methods described, test count rates can be obtained which result from gamma radiation from a source after having passed through a test item. The test item can be a chamber or container in which density or level is to be monitored. Such methods are described, for example, in U.S. Pat. No. 7,469,033 and U.S. patent publication U.S. 20120033792. The change in count rate can indicate changes in density or location of a liquid level. Methods, apparatus, and computer program products of the present invention can be used to control scintillation detector gain in such methods or any method where count rates are to be monitored. In any such application, integral count rates from a radiation source are measured following passage through a test item (sometimes referenced as "test count rates"). Such test count rates can be collected at an energy threshold which lies on a plateau region of integral count rate versus threshold. This situation is illustrated in FIG. 7 which is a plot of integral count rates versus threshold for Cs137 similar to FIGS. 2 and 3, but showing a plateau region 160 at which test count rates are obtained. The plateau region has the best signal to noise ratio (SNR) that provides the highest effective amplitude from a given radiation source and which will be least affected by small changes in scintillation detector gain. This enables high repeatability and the high precision. Methods of the present invention can use the same source for the test count rates as the calibration rates. This is particularly convenient since a scintillation detector of the present invention can be shipped to a user at a remote location without shipping a reference radiation source at the same time. This avoids any permit requirements in shipping radiation sources. In addition, in many applications the shape of the plots of integral count rate versus threshold will remain the same for many test items (though count rates may vary). For example, this will be true for most level or density measurements using transmission. As a result the calibration counts and gain adjustments can be performed continuously with the test item in place between the radiation source and scintillation detector and while test counts are collected (though test counts collected when the calibration is off may be rejected).

The particular embodiments described in detail above can be relatively easily implemented in hardware as illustrated by FIG. 8. In FIG. 8, the scintillation detector shown has a doped NaI scintillation crystal 200, and PMT 220 which receives light from crystal 200. Voltage pulses from PMT 220 are fed to a processor 230, which includes an amplifier 234, calibration comparators 240$t$, 240$m$, 240$b$, test comparator 250, and a microcontroller 270. Amplifier 234 amplifies the signal from PMT 220 and generates pulses of a voltage dependent upon the energy of a gamma ray detected by scintillator crystal 200. The voltage pulses are made available to test count comparator 250, as well as the three calibration comparators 240$t$, 240$c$, 240$b$. Test count comparator 250 has a threshold set in a plateau region of integral count rate versus threshold, as previously described in connection with region 160 of FIG. 7. Comparators 240$t$, 240$c$, 240$b$, have thresholds set at V1, V2, and V3, respectively, as described above in connection with FIG. 3. Microcontroller 270 continuously generates calibration count rates Ct, Cm, Cb as well as a test count rate, each measured over 1 second and performs the first and second comparisons described above in connection with (III) and (IV). Microcontroller 270 performs these calculations and adjusts the high voltage to PMT 220 (and hence controls gain) through control line 270, as will now be described with reference to the state diagram of FIG. 9. Microcontroller 270 can be any combination of hardware/software to carry out those functions, for example a programmable microprocessor in conjunction with a high voltage control circuit.

Referring to FIG. 9, when the instrument is turned on or reset (300) then following an initialization routine Ct, Cb, and Cc are read (330) and K calculated (340) per the first comparison of (IV), that is K=Ct/Cb. If K is not at least equal to a minimum preselected value representative of slope m of region 50 in FIG. 2 (Cs137) or 140 in FIG. 6 (Co60) then gain is too low and the high voltage to PMT 220 is increased (350) and the Ct, Cb, Cc readings obtained again (370) after some delay in the order of a seconds (360) (for example, 1 to 10 seconds), to allow for the tube to stabilize after the voltage increase (which may be in the order of mV, for example 1 to 20 or 1 to 100 mV) and the cycle repeated. As previously mentioned, it has been found in practice that a K>2 can be used. Once this condition of (340) has been satisfied, then the calibration count rates are from region 50 (Cs137 of FIG. 2) or region 140 (Co60 of FIG. 6) and A and B are then calculated according to (IIIa) and (IIIb) above and compared (380) according to the second comparison to see if A=B or not. If A equals B within a predetermined acceptable tolerance (420, 390) then Ct, Cb, Cc are read again (440, 410) after a suitable delay (430, 410) and the sequence repeated continuously. Should a result from (380) show that A>B beyond the predetermined tolerance, then the gain is too low and it is then increased by increasing the PMT voltage (450) and, following a suitable delay (460) further Ct, Cb, and Cc readings are obtained and the sequence 340-380 is repeated. Similarly if the result (380) show that A<B beyond a predetermined tolerance (390) then gain is too high and it is then decreased by decreasing PMT voltage (480) and Ct, Cb, Cc are read again (500) following a suitable delay (490) and the sequence 340-380 is repeated.

Particular embodiments of the present invention have been described in detail above. However, it will be apparent that variations and modifications of the described embodiments are possible. Accordingly, the present invention is not limited by the embodiments described above.

The invention claimed is:

1. A method for controlling gain in a scintillation detector comprising a scintillator and a photomultiplier tube which receives light from the scintillator, the method comprising:
    exposing the scintillator to a radiation source;
    obtaining calibration count rates from the photomultiplier tube, each representing an integral count rate above a different energy threshold;
    performing a first comparison of at least some of the calibration count rates, and when a result of the first comparison indicates that the calibration count rates do not correspond with a reference peak in the energy spectrum of the radiation source, performing a first adjustment of the photomultiplier tube gain until the result indicates the calibration count rates correspond with the reference peak; and performing a second comparison of at least some of the calibration count rates which is different from the first comparison and, when a result of the second comparison varies from a relationship of integral count rate versus the different energy thresholds resulting from the reference peak, performing a second adjustment of photomultiplier tube gain so as to reduce the variation.

2. A method according to claim 1 wherein the relationship of integral count rate versus the different energy thresholds from the reference peak is linear.

3. A method according to claim 2 wherein the first comparison comprises determining if a line on which the at least some calibration count rates lie meets a predetermined slope requirement.

4. A method according to claim 3 wherein the determining comprises calculating a ratio of at least some of the calibration count rates.

5. A method according to claim 3 wherein:
the multiple calibration count rates comprise three integral count rates obtained at upper, intermediate, and lower energy thresholds; the second comparison comprises comparing the difference between the calibration count rates at the upper and intermediate energy thresholds, with the difference between the calibration count rates at the intermediate and lower energy thresholds; and the second adjustment of photomultiplier tube gain is performed when the two differences are not representative of a straight line.

6. A method according to claim 5 additionally comprising obtaining a test count rate from the photomultiplier tube when exposed to the same radiation source used for the calibration count rates, at an energy threshold which lies on a plateau region of integral count rate versus energy threshold.

7. A method according to claim 3 wherein the radiation source exhibits two peaks in the energy spectrum and the reference peak is one of the peaks.

8. A method according to claim 1 wherein the radiation source comprises Cs137 or C060.

9. A method according to claim 8 wherein the scintillator comprises a NaI crystal.

10. A method according to claim 1 wherein a same radiation source is used to provide the calibration and test count rates.

11. A method according to claim 1 wherein energy threshold comprises voltage threshold.

12. A method for controlling gain in a scintillation detector comprising a scintillator and a photomultiplier tube which receives light form the scintillator, the method comprising:
exposing the scintillator to a radiation source;
obtaining calibration count rates from the photomultiplier tube, each representing an integral count rate above a different energy threshold;
performing a comparison of the multiple calibration count rates and, when a result of the comparison varies from a relationship of integral count rate versus the different energy thresholds resulting from a reference peak, performing an adjustment of photomultiplier tube gain so as to reduce the variation; and
obtaining from the photomultiplier tube, when exposed to the same radiation source, a test count rate representing an integral count rate at an energy threshold which lies on a plateau of integral count rate versus energy threshold.

13. A method according to claim 12 wherein the calibration count rates are obtained with a test item in place between the radiation source and the scintillator.

14. A method according to claim 12 wherein the photomultiplier tube gain adjustment is performed with the test item in place between the radiation source and the scintillator.

15. A method according to claim 12 wherein the relationship of integral count rate versus the different energy thresholds from the reference peak is linear.

16. A method according to claim 15 wherein:
the multiple calibration count rates comprise three integral count rates obtained at upper, intermediate, and lower energy thresholds;
the comparison comprises comparing the difference between the calibration count rates at the upper and intermediate energy thresholds, with the difference between the calibration count rates at the intermediate and lower energy thresholds; and
the adjustment of photomultiplier tube gain is performed when the two differences are not within a tolerance of being equal.

17. A method according to claim 16 wherein the test count rate has an energy threshold which lies on a plateau region of integral count rate versus energy threshold.

18. A method according to claim 12 wherein energy threshold comprises voltage threshold.

19. A scintillation detector comprising:
a scintillator;
a photomultiplier tube which receives light from the scintillator; and
a processor which, in response to exposure of the scintillator to a radiation source:
obtains calibration count rates from the photomultiplier tube, each representing an integral count rate above a different energy threshold;
performs a first comparison of at least some of the calibration count rates, and when a result of the first comparison indicates that the calibration count rates do not correspond with a reference peak in the energy spectrum of the radiation source, performs a first adjustment of the photomultiplier tube gain until the result indicates the calibration count rates correspond with the reference peak; and
performs a second comparison of the calibration count rates which is different from the first comparison and, when a result of the second comparison varies from a relationship of integral count rate versus the different energy thresholds resulting from the reference peak, performs a second adjustment of photomultiplier tube gain so as to reduce the variation.

20. A scintillation detector according to claim 19 wherein the relationship of integral count rate versus the different energy thresholds from the reference peak is linear.

21. A scintillation detector according to claim 20 wherein the first comparison comprises calculating a ratio of calibration count rates.

22. A scintillation detector according to claim 19 wherein the radiation source exhibits two peaks in the energy spectrum and the reference peak is one of the peaks.

23. A scintillation detector according to claim 19 wherein:
the multiple calibration count rates comprise three integral count rates obtained at upper, intermediate, and lower energy thresholds;
the second comparison comprises comparing the difference between the calibration count rates at the upper and intermediate energy thresholds, with the difference between the calibration count rates at the intermediate and lower energy thresholds; and the second adjustment of photomultiplier tube gain is performed when the two differences are not within a tolerance of being equal.

24. A method according to claim 19 wherein energy threshold comprises voltage threshold.

25. A scintillation detector comprising:
a scintillator;
a photomultiplier tube which receives light from the scintillator; and
a processor which, in response to exposure of the scintillator to a radiation source,
obtains calibration count rates from the photomultiplier tube, each representing an integral count rate above a different energy threshold;
performs a comparison of the multiple calibration count rates and, when a result of the comparison varies from a relationship of integral count rate versus the different energy thresholds resulting from the reference peak, performs an adjustment of photomultiplier tube gain so as to reduce the variation; and
obtains from the photomultiplier tube, when exposed to the same radiation source, a test count representing an integral count rate at an energy threshold which lies on a plateau of integral count rate versus energy threshold.

26. A scintillation detector according to claim 25 wherein the relationship of integral count rate versus the different energy thresholds from the reference peak is linear.

27. A scintillation detector according to claim 26 wherein:
the multiple calibration count rates comprise three integral count rates obtained at upper, intermediate, and lower energy thresholds;
the comparison comprises comparing the difference between the calibration count rates at the upper and intermediate energy thresholds, with the difference between the calibration count rates at the intermediate and lower energy thresholds; and
the adjustment of photomultiplier tube gain is performed when the two differences are not within a tolerance of being equal.

28. A scintillation detector according to claim 27 wherein the processor comprises four discriminator/counters which obtain respective ones of the calibration count rates and the test count rate.

29. A scintillation detector according to claim 23 wherein the scintillator comprises a NaI or CsI crystal.

30. A method according to claim 25 wherein energy threshold comprises voltage threshold.

31. A computer program product carrying a computer program which, when loaded into a programmable processor, executes the method of:
obtaining calibration count rates from a photomultiplier tube of a scintillation detector exposed to a radiation source, each representing an integral count rate above a different energy threshold;
performing a first comparison of at least some of the calibration count rates, and when a result of the first comparison indicates that the calibration count rates do not correspond with a reference peak in the energy spectrum of the radiation source, performing a first adjustment of the photomultiplier tube gain until the result indicates the calibration count rates correspond with the reference peak; then performing a second comparison of the calibration count rates which is different from the first comparison and, when a result of the second comparison varies from a relationship of integral count rate versus the different energy thresholds resulting from the reference peak, performing a second adjustment of photomultiplier tube gain so as to reduce the variation.

32. A computer program product according to claim 31 wherein the relationship of integral count rate versus the different energy thresholds from the reference peak is linear.

33. A computer program product according to claim 32 wherein the second comparison comprises calculating a ratio of two of the calibration count rates.

34. A method according to claim 31 wherein energy threshold comprises voltage threshold.

* * * * *

UNITED STATES PATENT AND TRADEMARK OFFICE
CERTIFICATE OF CORRECTION

| | | |
|---|---|---|
| PATENT NO. | : 9,091,772 B2 | Page 1 of 1 |
| APPLICATION NO. | : 13/616508 | |
| DATED | : July 28, 2015 | |
| INVENTOR(S) | : Michael C. Bryant et al. | |

It is certified that error appears in the above-identified patent and that said Letters Patent is hereby corrected as shown below:

In Column 13, line 6, claim 24, please replace "method" with --scintillation detector--.

In Column 14, line 8, claim 30, please replace "method" with --scintillation detector--.

In Column 14, line 38, claim 34, please replace "method" with --computer program product--.

Signed and Sealed this
Eighth Day of March, 2016

Michelle K. Lee
*Director of the United States Patent and Trademark Office*